United States Patent [19]

Lal et al.

[11] Patent Number: 5,053,137
[45] Date of Patent: Oct. 1, 1991

[54] PROCESS FOR THE PURIFICATION OR REGENERATION OF CONTAMINATED OR SPENT PROCESS SULFOLANE

[75] Inventors: Raj K. J. Lal, Baroda; S. G. T. Bhat, Ellora Park, India

[73] Assignee: Indian Petrochemicals Corporation Limited, Gujarat, India

[21] Appl. No.: 396,519

[22] Filed: Aug. 21, 1989

[51] Int. Cl.$^5$ .............................. B01D 15/04
[52] U.S. Cl. .................... 210/669; 210/685
[58] Field of Search ................ 210/669, 685; 549/87

[56] References Cited

U.S. PATENT DOCUMENTS

| | | | |
|---|---|---|---|
| 3,252,997 | 5/1966 | Ridderikhoff et al. | 549/87 |
| 3,470,087 | 9/1969 | Broughton | 208/321 |
| 3,953,324 | 4/1976 | Deal et al. | 208/321 |
| 3,985,648 | 10/1976 | Casolo | 210/669 |
| 4,619,770 | 10/1986 | Boston | 210/772 |
| 4,820,849 | 4/1989 | Diaz et al. | 549/87 |
| 4,861,900 | 8/1989 | Johnson | 549/87 |

FOREIGN PATENT DOCUMENTS 2163741 3/1986 United Kingdom .
2194238 3/1988 United Kingdom .

OTHER PUBLICATIONS

Chemical Abstracts, vol. 108, No. 14, Apr. 4, 1988, Abstract No. 108:115545x.

*Primary Examiner*—Ivars Cintins
*Attorney, Agent, or Firm*—Ladas & Parry

[57] ABSTRACT

There is provided a process for the regeneration and/or purification of contaminated process sulfolane or spent sulfolane. The process includes passing contaminated or spent sulfolane through a pair of columns arranged in series, with the first of the columns containing cation exchanger resin and the second containing anion exchanger resin. The contact between the sulfolane and the ion exchange resins is effected at a temperature of from 20° to 80° C.

15 Claims, No Drawings

PROCESS FOR THE PURIFICATION OR REGENERATION OF CONTAMINATED OR SPENT PROCESS SULFOLANE

FIELD OF INVENTION

This invention relates to a process for the regeneration and/or purification of contaminated process sulfolane or spent sulfolane. "Sulfolane" is the popular name for thiophene tetrahydro-1,1 dioxide and is extensively employed in refineries and the petrochemical industries in general as an industrial solvent in the extraction of aromatic hydrocarbons, e.g. benzene, toluene and xylenes, from mixtures of such aromatic hydrocarbons with non-aromatic hydrocarbons such as paraffins, olefins and naphthenes.

By the term "regeneration and/or purification" throughout this specification is meant removal of both particulate and dissolved impurities from the sulfolane in order to make it reusable.

BACKGROUND OF THE INVENTION

In the normal practice of aromatic extraction, solvent sulfolane inventory is recycled at a very high rate and during each cycle it is heated and cooled. As a result it undergoes degradation producing acidic materials. It is desirable to remove these acidic materials since, if they are allowed to accumulate, the presence of the acids can result in the corrosion and erosion of equipment. Furthermore, when the solvent accumulates large levels of impurities, its boiling point increases and it generally becomes unusable. As a result, such contaminated or spent sulfolane is generally drained off the system and discarded. One way or another, therefore, removal of these impurities or in other words regeneration of spent sulfolane would be advantageous.

Since degradation of sulfolane generates acidic materials, it is conventional to measure the level of contamination of the solvent in terms of acid value and pH. Acid value of the sulfolane is defined in terms of milligrams of alcoholic potassium hydroxide required to neutralize a one gram sample of solvent and is determined titrametrically using a potentiometer or an acid-base visual indicator suitable for non-aqueous titration. The pH of the sulfolane is measured after diluting it with an equal volume of distilled water. It may be noted that the pH of the sample is an indication of the presence of only strong and moderately weak acidic materials, whereas acid value gives the total acidity. Development of color reduces the transmittance of the sulfolane, and therefore, it is determined spectro-photometrically using distilled water or fresh sulfolane, which is colorless, as a reference.

It is known to employ monoethanol amine (MEA) for the neutralization of the acidic products of sulfolane degradation but the MEA salts formed are not completely stable and can decompose at the temperature of operation. Neutralization with sodium hydroxide forms stable salts but it has an adverse effect on solvent stability. Hence, if the solvent is not to be discarded altogether, it becomes essential to regenerate spent sulfolane.

According to the known art, regeneration of spent sulfolane can be done by one of the following methods, viz. vacuum or steam distillation, back extraction and adsorption. Regeneration by vacuum distillation only removes high boiling materials and involves relatively high capital cost. Regeneration by steam distillation is relatively less capital intensive but also has the limitation of removing only high boiling materials. Regeneration by back-extraction, on the other hand, is a more rigorous method and removes both light and heavy degradation products. However, it is the most expensive regeneration process. Regeneration by adsorption on activated alkaline alumina is satisfactory in the case of highly contaminated solvent but when the acid content is low, as it is in normal operation, the regenerated solvent becomes alkaline and less stable than before.

SUMMARY OF INVENTION

The principal object of the present invention is to develop a process for cleaning up both contaminated process sulfolane (also known as "lean solvent") and spent sulfolane either of which is generally discarded under existing practice. The purpose is clear; to treat the sulfolane so that it can be reused for aromatic extraction from mixtures containing aromatics. This "cleaning up" envisages the removal of both suspended particulate matter as well as dissolved ionic and polar impurities from the sulfolane.

Towards achieving the object of the invention, the applicants have experimented with ion exchange systems for the treatment of contaminated or spent sulfolane for the purpose of decontaminating and regenerating it. It has been found that when contaminated or spent sulfolane is passed through a column of anion exchange resin, substantially all acidic impurities present in the solvent can be removed. However, by employing a cation exchange resin in combination with the anion exchange resin, a far better performance in terms of purification and regeneration of the sulfolane is obtained. For instance, employing a two column system of a cation exchange resin column followed by an anion exchange resin column, it was found that the acid value of the treated sulfolane decreased significantly while the pH of the solvent correspondingly increased until both these parameters corresponded substantially to the acid value and pH levels of fresh sulfolane.

DETAILED DESCRIPTION

The inventors have established that the nature of the cation and anion exchange resins plays an important role in the purification of contaminated or spent sulfolane. When a contaminated or spent sulfolane is passed through a cation exchange resin column followed by an anion exchange resin column, it was found that the acid value of the treated sulfolane decreased significantly while the pH of the solvent correspondingly increased until both these parameters corresponded substantially to the acid value and pH levels of fresh sulfolane.

The inventors have established that the nature of the cation and anion exchange resins plays an important role in the purification of contaminated or spent sulfolane to produce a product still providing a totally reliable performance.

Two significant advantages which derive from the procedure followed by the applicants concern the color of the sulfolane and its thermal stability. It has been found that color, which is a feature of contaminated or spent sulfolane, is substantially removed following treatment of the sulfolane in a two-column system. Secondly, the thermal stability of sulfolane purified in such a system is comparable to or even better than that of fresh sulfolane.

The amount of sulfolane purified by a unit volume or mass of the resins employed will depend upon the load, i.e. the level of impurities in the sulfolane. The lower the level of ionic contamination, the higher is the amount of sulfolane purified in each cycle by a unit volume/mass of the resin. Both strong and weakly acidic impurities can be removed from the sulfolane using a pair of the suggested cation-anion exchange resins in series configuration. Moreover, the employment of a suitable filter for the initial removal of particulate matter improves the stability of the sulfolane still further.

Once the cycle is over and the sulfolane has been purified or should the cation-anion exchange resins become spent, the resins can be conveniently regenerated by means of acidic and alkaline solutions of the desired concentration whereafter the regenerated resins can be employed once again for sulfolane purification.

Accordingly, the present invention provides a process for the purification or regeneration of contaminated or spent process sulfolane which comprises passing said contaminated or spent sulfolane through at least a pair of columns arranged in series, the first of said columns containing cation exchange resin and the second anion exchange resin, the contact between said sulfolane and the ion exchange resins being effected at a temperature of from 20° C. to 80° C.

Preferably, the contaminated or spent sulfolane is passed first through a microfilter of a size range 1 to 25 microns prior to being contacted with the ion exchange resins in said pair of columns.

The hourly space velocity, i.e. the rate of flow of the spent sulfolane per unit volume of the resin in the columns, is preferably from 1 to 20 per hour.

In accordance with a preferred feature, the ion exchange resins employed in the solvent purification process of the present invention have a three-dimensional polymeric network such as that of the copolymer of styrene with divinyl benzene. The combination most preferred is a strong cation exchange resin with sulfonic acid groups and a weak free-base anion exchange resin.

The cation resin employed can be in any form but the $H^+$ form is preferred. The exchange capacity of the cation resin is preferably in the range of 0.1 to 5.0 milliequivalent per gram of the dry resin.

The anion resin can possess quaternary ammonium, secondary amine or tertiary amine functional groups. Of these, the free base tertiary amine resin having an exchange capacity in the range of from 0.5 to 4.5 milliequivalent per gram of dry resin is found to be most advantageous.

The process of the invention is capable of handling spent sulfolane which is severely contaminated with degraded products, for instance those resulting from use of the solvent in the extraction of aromatics from mixtures of aromatic and non-aromatic hydrocarbons. A typical example is the sulfolane constituting the normally discarded bottoms product from the solvent recovery unit of an aromatic extraction plant.

The spent sulfolane which the process of the invention handles can contain impurities in dissolved and/or suspended form. Suspended impurities may be present in the range of from .01% to 2% and a size range of from 1 to 50 microns and may be composed of from 10% to 95% iron. Dissolved impurities, including both strong and weak acids and polar non-ionic substances, may be present at a level at which from 0 to 0.8 mg of KOH is required to neutralize the acidic impurities present in one gram of the solvent. Examples of strongly acidic substances include sulfonic acids and those of weakly acidic substances include carboxylic acids. Examples of polar non-ionic substances are aldehydes and ketones.

On treating spent and/or contaminated sulfolane in accordance with the process of the invention, the eluted solvent issuing from the resin columns possesses very low acid value. However, as the process is worked and more and more contaminated solvent is passed through the columns, the resin within the columns adsorbs a continuously increasing amount of impurities with the result that the acid value of the treated solvent issuing from the columns gradually increases. When this acid value exceeds a predetermined value, referred to in the art as the "break-through point", this is the signal for the process to be discontinued and for the resins to be regenerated.

For the purpose of regeneration, the resins are back washed with water and then regenerated with acid and alkali solutions. Any mineral acid in the concentration range 0.5 to 8N may be used for the regeneration of cation exchange resin and an aqueous alkali such as KOH, NaOH, $NH_4OH$ in the concentration range 1 to 8N may be used for regenerating anion-exchange resin. The optimum performance is obtained with 5N hydrochloric acid and 5N sodium hydroxide for regeneration of cation and anion-exchange resins respectively. Both top to bottom and bottom to top normal flow and back wash regeneration may be used. However, bottom to top back-wash and regeneration and top to bottom normal flow gives the better performance.

After regeneration, the regenerated resins are washed with water to remove acids and alkali and may be re-used. Resin regeneration can also be done batchwise by contacting the resins with aqueous solutions of regenerants. This process may also be used in situ in aromatic extraction plants to remove continuously, degraded acidic products thereby avoiding their accummulation during use.

The novelty and importance of the present invention resides in fact that there is provided for the first time a single step process for the removal of both particulate and dissolved contaminants in sulfolane solvent which contaminants are not only widely differing in nature with disparate high and low boiling points but can also be acidic, basic and/or non-ionic in character. Furthermore, the process of this invention eliminates the need for the conventionally adopted neutralization step in order to suppress solvent acidity in sulfolane recovery units of aromatic extraction plants.

The invention will now be described in greater detail in the following non-limitative examples.

EXAMPLE 1

A sample of lean solvent (acid value 0.13 mg KOH/g sample, pH of 1:1 sulfolane/water mixture 6.0) was passed through anion and cation-exchange resin columns prepared in burette individually and in series combination. Eluted solvent through anion column had pH and acid value 11.0 and 0.045 respectively and that eluted through only cation exchange column had pH of 2.8 and acid value of 0.15. Solvent eluted through cation column followed by anion exchange column exhibited values 7.0 and 0.020 for pH and acid value respectively and that through cation column preceded by anion column had a pH 3.0 and an acid value of 0.14.

EXAMPLE 2

A sample of spent sulfolane solvent of acid value 0.18 (mg of KOH/g of solvent) was collected from the bottom of the vacuum distillation unit of the solvent extraction plant and passed under gravity through two glass columns of 1 cm internal diameter arranged in series, the first containing cation-exchange resin and another containing equal volume of anion-exchange resin. The eluent of the first column was fed manually to the second column. Purified solvent of acid value as low as 0.01 mg KOH/g sample was obtained in the beginning. This acid value increased gradually as more and more solvent was passed. At an acid value of 0.06 mg KOH/g, a resin to purified solvent ratio of 1:40 could be obtained. The purified solvent has an average acid value of 0.030. The percent transmittance of the solvent was increased from 20 percent to 80% after passing through the resins.

A sample of lean solvent having acid value 0.145 (mg KOH/g) was collected from aromatic extraction plant and allowed to flow at a rate of 1 ml/min under gravity through two columns as described hereinabove containing regenerated cation and anion-exchange resins. Acid value of the solvent eluted through the anion exchange resin column of the order of 0.01 was obtained as compared to that of the fresh solvent, which was in the range 0.035 to 0.048. At an acid value of 0.06, 750 ml of solvent (specific gravity 1.26) could be purified with 19.9 gm of anion resin giving a overall purified solvent to resin ratio (w/w) of 1:47. The regenerated solvent had stability profile similar to that of the fresh solvent.

EXAMPLE 3

A sample of contaminated process solvent of acid value 0.12 and transmittance 3% was allowed to flow continuously through two columns (internal diameter 20 mm, height 60 cm) containing ion-exchange resins with free board packing at various flow rates in the range 1 ml/min to 40 ml/min using a pump. The volume of the anion-exchange resin was twice that of the cation-exchange resin. At an acid value of 0.06, an anion resin to purified solvent ratio of 1:90 could be obtained. The eluted solvent had a transmittance of 60% to begin with and decreased gradually until, at the breakthrough point, it had a value of over 10%.

The same ion-exchange resins after regeneration and back-wash were reused for purification of another sample of contaminated process solvent of acid value 0.134 and a percent transmittance of 5% at a constant flow rate of 8 ml/min. A purified solvent to resin ratio (w/w) of 1:85 was obtained, with nearly a two-fold increase in percent transmittance at the breakthrough point corresponding to an acid value of 0.06. The average acid value of the purified solvent below the breakthrough point was of the order of 0.03 mg KOH/g sample.

EXAMPLE 4

A sample of contaminated process solvent of acid value 0.14 and a percent transmittance of 10% was purified continuously by passing the solvent through a series of two columns, the first containing 60 gms cation-exchange resin and the second containing 75 gms anion-exchange resin at a constant flow rate of 7.8 ml/min. The acidity and transmittance profiles were similar to that illustrated in Example 3. 6.7 liters of the contaminated solvent could be purified when the acid value of the eluted solvent reached a value of 0.05. The transmittance of the solvent purified at the breakthrough point had a value twice that of the contaminated solvent feed.

The advantages of the present invention are several. However, chief among these is the versatility of the process with respect to the choice of starting material i.e., contaminated sulfolane. Thus, virtually any contaminated sulfolane can be purified by the process of this invention. This includes spent sulfolane discarded from the bottom of a vacuum distillation unit, sulfolane containing both particulate and/or dissolved impurities and sulfolane contaminated by both strong and weakly acidic materials. The color of contaminated solvent treated by the process of the invention is considerably improved and the treated sulfolane has been found to be comparable if not better in quality than fresh sulfolane.

Other important advantages of the invention reside in the ability of the process to be worked continuously or batchwise. Its application to an aromatic extraction unit prevents the build-up of acidic materials in such unit and thus minimizes or even eliminates altogether the possibility of corrosion to equipment and vessels. The use of the process of the invention with such unit over a period of time will therefore be instrumental in increasing the life of each cycle with a corresponding decrease in the frequency of resin regeneration.

Finally, the resins which the process employs can be regenerated with aqueous regenerant solutions and re-used time and again without deterioration thereby making the process economically attractive.

We claim:

1. A process for the purification or regeneration of contaminated or spent sulfolane which comprises passing said contaminated or spent sulfolane through at least a pair of columns arranged in series, the first of said columns containing cation exchange resin and the second containing anion exchange resin, the contact between said sulfolane and the ion exchange resins being effected at a temperature of from 20° C. to 80° C.

2. A process as claimed in claim 1 wherein prior to being contacted with said cation and anion exchange resins in said columns, said contaminated or spent sulfolane is passed through a microfilter of a size range of 1 to 25 micrometers.

3. A process as claimed in claim 1 wherein said contaminated or spent sulfolane is passed through said reins in said columns at an hourly space velocity per unit volume of said resin of 1 to 20.

4. A process as claimed in claim 1 wherein said ion exchange resins possess a three-dimensional polymeric network.

5. A process as claimed in claim 1 wherein the cation exchange resin of said pair of columns is a strongly acidic cation exchange resin and the anion exchange resin is a weakly basic anion exchange resin.

6. A process as claimed in claim 1 wherein said cation exchange resin is of the H+ form.

7. A process as claimed in claim 6 wherein said cation exchange resin has an exchange capacity of from 0.1 to 5.0 milli-equivalent per gram of dry resin.

8. A process as claimed in claim 1 wherein said anion exchange resin possesses quaternary ammonium, secondary amine or tertiary amine functional groups.

9. A process as claimed in claim 8 wherein said anion exchange resin is a tertiary amine resin having an exchange capacity of from 0.5 to 4.5 milli-equivalent per gram of dry resin.

10. A process as claimed in claim 1 wherein said contaminated or spent sulfolane is the discarded bottoms product from a vacuum distillation unit.

11. A process as claimed in claims 1 wherein said contaminated or spent sulfolane contains suspended particulate impurities of the level of from 0.1% to 2.0% and a size range of from 1 to 50 microns.

12. A process as claimed in claim 11 wherein said suspended particulate impurities are composed of from 10% to 95% iron.

13. A process as claimed in claim 1 wherein said contaminated or spent sulfolane contains dissolved acidic impurities at a level at which from 0 to 0.8 mg of potassium hydroxide is required to neutralize the acidic impurities present per gram of the sulfolane.

14. A process as claimed in claim 13 wherein said dissolved acidic impurities comprise sulfonic acids, carboxylic acids aldehydes or ketones or a combination thereof.

15. A process as claimed in claim 1 wherein the weight ratio of the anion exchange resin to the cation exchange resin is about 1.25.

* * * * *